United States Patent [19]

Clark

[11] 4,378,596

[45] Mar. 29, 1983

[54] MULTI-CHANNEL SONIC RECEIVER WITH COMBINED TIME-GAIN CONTROL AND HETERODYNE INPUTS

[75] Inventor: Lloyd D. Clark, San Francisco, Calif.

[73] Assignee: Diasonics Cardio/Imaging, Inc., Salt Lake City, Utah

[21] Appl. No.: 353,010

[22] Filed: Mar. 1, 1982

Related U.S. Application Data

[63] Continuation of Ser. No. 172,323, Jul. 25, 1980, abandoned.

[51] Int. Cl.³ .......................... G01S 15/02; G01S 7/52
[52] U.S. Cl. .......................................... 367/87; 73/900; 343/5 SM; 367/900
[58] Field of Search ............. 343/5 SM; 367/900, 87, 367/99, 102; 73/900; 455/232, 236, 246, 247

[56] References Cited

U.S. PATENT DOCUMENTS

| | | | |
|---|---|---|---|
| 2,798,949 | 7/1957 | Scholz | 343/5 SM |
| 2,984,741 | 5/1961 | Bronstein et al. | 343/5 SM |
| 3,987,403 | 10/1976 | Smith | 367/102 |

*Primary Examiner*—Richard A. Farley
*Attorney, Agent, or Firm*—Blakely, Sokoloff, Taylor & Zafman

[57] ABSTRACT

In a receiver for pulsed ultrasonic beams, it is sometimes desirable to translate the received signal to a lower carrier frequency by a heterodyne process. It is also often desirable to vary the receiving channels' gain during the period when signals are being received from a single transmitted pulse, to compensate for the attenuation of later-arriving signals from a greater distance. To get both the heterodyne and the time-gain control functions in a prior-art receiver of N channels requires 2 mixers in each channel, or 2N mixers. According to the invention, the heterodyne and the time-gain control signals are combined in one master mixer and fed to all the channel mixers. The only N+1 mixers are required.

2 Claims, 4 Drawing Figures

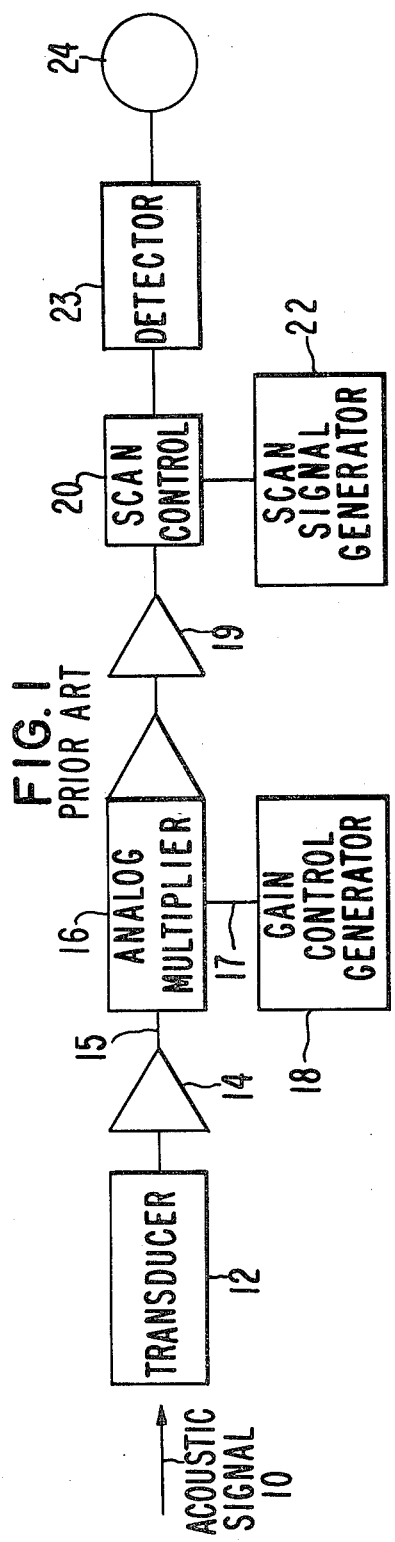
FIG. 1 PRIOR ART
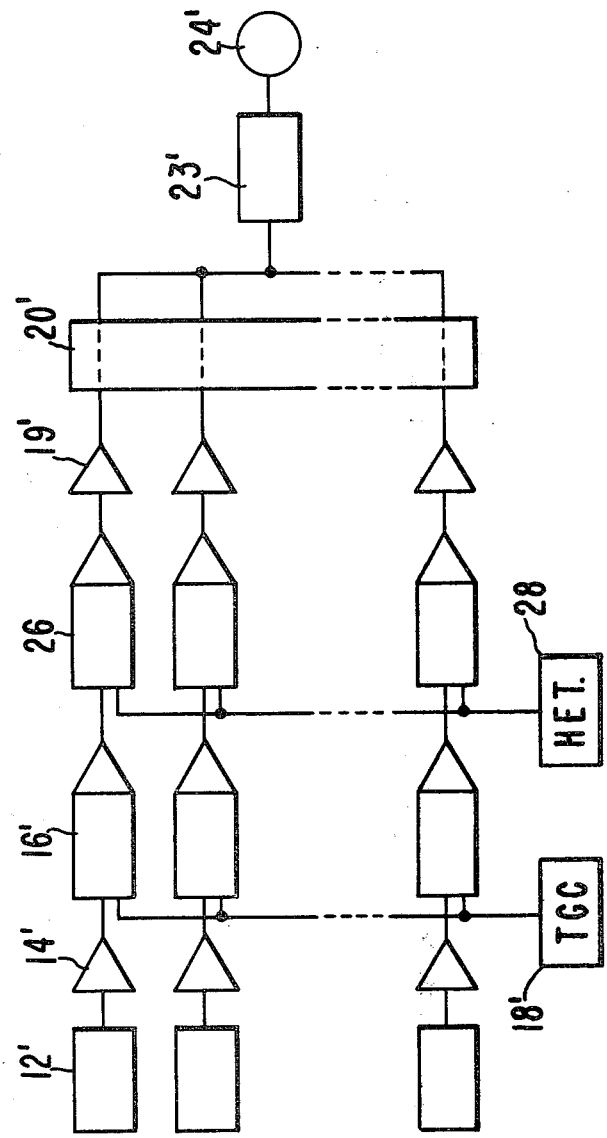
FIG. 2 USING PRIOR ART

MULTI-CHANNEL SONIC RECEIVER WITH COMBINED TIME-GAIN CONTROL AND HETERODYNE INPUTS

This is a continuation of application Ser. No. 172,323 filed July 25, 1980, now abandoned.

BACKGROUND OF THE DESCRIPTION

1. Field of the Invention

The invention pertains to systems for observing objects by directed beams of high frequency sound waves. Such systems work by receiving waves which have been scattered, absorbed or transmitted by the objects. A system widely used in medicine uses a receiving beam which is scanned in angle by a phased array of receiving antennas.

2. Prior Art

It has been common in the past to use a "time-gain control"(TGC) with an ultrasonic observing system. Such systems generally receive the wave reflected by a place in the field of view where there is a change in wave impedance or velocity, such as the surface of an internal organ in the body. The distance to the reflecting point is measured by the time delay of the reflected signal. The strength of the reflected signal falls off very rapidly with distance. There is, in the far-field pattern of the antennas, an inverse fourth-power decrease with distance due to the spreading of the transmitted and then of the reflected waves. Also, the ultrasonic waves are attenuated as they pass through matter, quite rapidly in the case of medical diagnostics. This produces an exponential decrease with distance. The net effect is a rapid decrease of signal strength with time during the interval that reflections from a single transmitted pulse from objects at increasing distances are being observed. To compensate for this decrease the TGC increases with time the gain of the receiver amplifier.

Another prior-art feature of some ultrasonic receivers has been the use of a superheterodyne frequency conversion of the received signals. In a phased-array receiver each antenna element feeds a separate amplifying and phase delaying channel before being combined in the output. The signal-processing components in the channel are often cheaper and better when the carrier frequency is reduced by heterodyne conversion. For example, the signal frequency may be 2 to 5 megahertz and the signal-processing frequency 1 megahertz.

SUMMARY OF THE INVENTION

An object of this invention is to provide a sonic receiver with time-gain control and heterodyne conversion using a minimum number of components.

A further object is to provide a receiver of reduced cost.

A further object is to provide a phased array receiver of improved reliability.

These objects are achieved by combining the TGC and the superheterodyne signals in a way such that only a single analog multiplier is needed for each signal channel.

BRIEF DESCRIPTION OF THE DRAWINGS

FIG. 1 is a block diagram of a prior-art receiving channel having TGC.

FIG. 2 is a block diagram of a multi-channel receiving system incorporating both TGC and heterodyne conversion.

DESCRIPTION OF THE PREFERRED EMBODIMENTS

Figure 4:
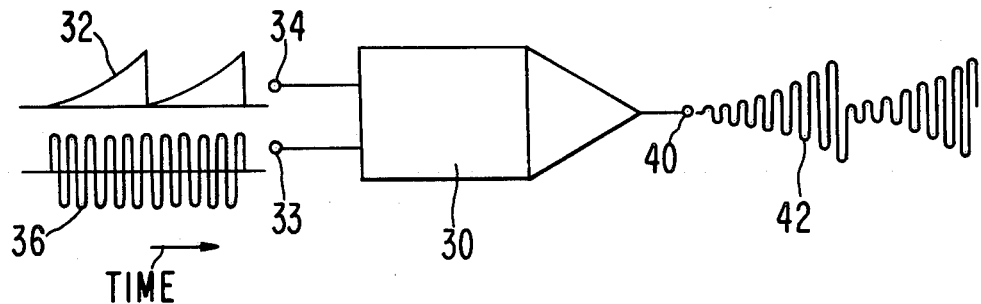
FIG. 4 is a waveform diagram of the combined generated signals.

FIG. 1 is a schematic diagram of a single channel of an acoustic receiver as known in the prior art. A scanning receiver may employ a large number of such channels with means to select the direction of the received beam by appropriate phase delays in each channel. The received acoustic signal 10, typically a short pulse of compressional waves with a frequency of several megahertz, falls upon the input transducer 12, such as a piezoelectric crystal. The transduced electric signal is amplified by a linear amplifier 14 and enters a first input 15 of an analog multiplier 16. The other input 17 of analog multiplier 16 is fed a gain control signal from a TGC generator 18. The TGC signal is a waveform increasing with time following the radiation of an acoustic wave pulse from the transmitter (not shown). Analog multiplier 16 is an amplifier which generates a signal in its output equal to the product of the two input signals. Another way of describing this is that the gain of analog multiplier 16 for the received signal of input 15 is made proportional to the amplitude of the TGC signal applied to input 17. Thus the weaker received signals from more distant reflecting objects are amplified more to produce a relatively constant output. Analog multiplier 16 need not produce the exact product of its two input signals; a variety of non-linear mixers may be used, provided they respond to the monopolarity of the TGC signal. The compensated output of analog multiplier 16 may be further amplified by a second linear amplifier 19. In a phased-array system it then goes through a scan control unit 20 which may typically be a variable phase-delay circuit for setting the phase of the received signal relative to the phase in the other channels whereby the direction to the received beam is controlled. Scan control 20 receives its delay information signal from a scan signal generator 22 which controls all of the receiver channels. From scan control 20 the signal is demodulated by a detector 23 and displayed on an output display 24 which may be a scanning cathode ray tube with brightness-modulated signals on a fan-shaped angle-vs-distance map of the reflecting field.

FIG. 2 is a schematic diagram of a multi-channel receiver using elements of the prior art. In addition to the functional elements of FIG. 1, the receiver uses heterodyne frequency conversion to reduce the carrier frequency to a lower value, such as 1 megahertz where the signal-processing is easier. Each channel comprises a transducer 12', amplifier 14' and TGC mixer 16'. All the TGC mixers 16' are fed the same TGC signal from a common generator 18'. Following TGC mixers 16' is a second set of heterodyne mixers 26, each receiving the same superheterodyne signal from a common heterodyne generator 28. Mixers 26 may include or be followed by a set of filters (not shown) to remove the unwanted (upper) sideband signal. This is usually a much higher frequency than the useful lower sideband. Each channel signal is again amplified by a second linear amplifier 19' and it is delayed in time (and phase) in scan control 20' by the amount required for its position in the array at the instantaneous scan angle. The delayed output signals of all channels are then added to produce the signal reflected at the scan angle, demodulated in detector 23' and displayed on output display 24'. The addition of the heterodyne function has required the addition of a second mixer for each channel. The mixers are expensive circuits.

Figure 3:
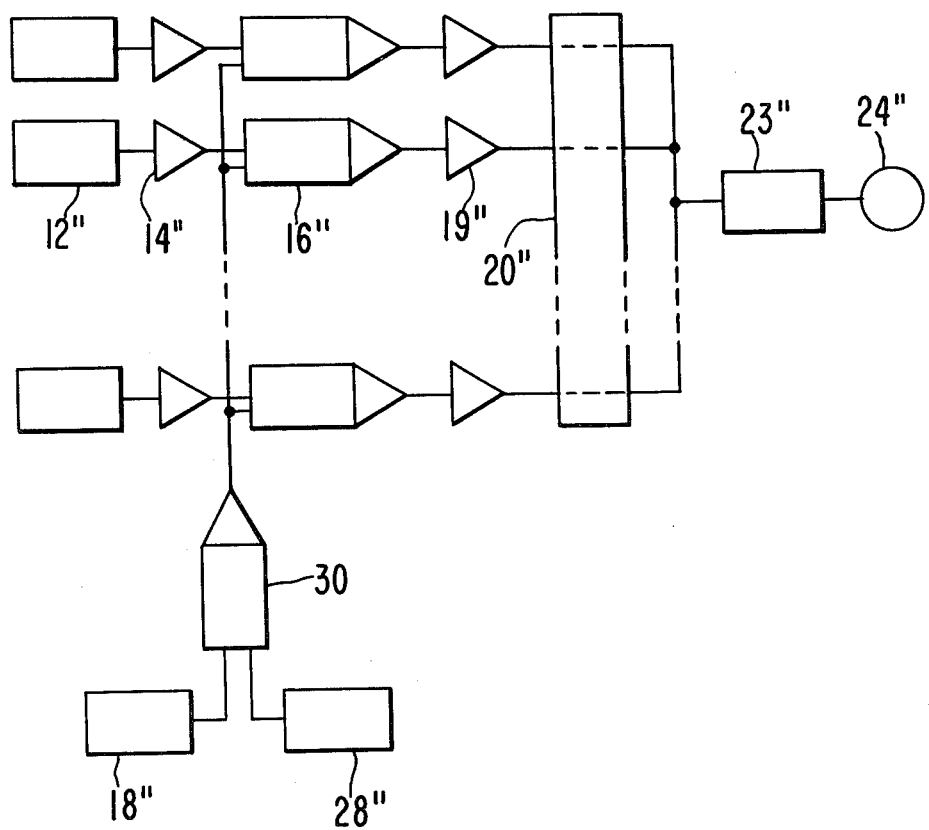
FIG. 3 is a block diagram of a multi-channel receiving system embodying the invention.

FIG. 3 is a schematic diagram of a multi-channel receiver incorporating the invention. Each channel comprises a transducer 12'', linear amplifier 14'', mixer 16'' and second linear amplifier 19''. The individual channels are phase delayed by scan control 20'' as discussed in regard to FIG. 2, added together, demodulated by detector 23'' and displayed on output display 24''. A TGC generator 18'' produces the required TGC waveform and a superheterodyne generator 28'' produces a heterodyne signal. According to the invention, the TGC signal and the heterodyne signal are fed as the two inputs into a mixer 30 which preferably is an analog multiplier. The output of multiplier 30 is a heterodyne signal modulated by the TGC waveform. This combined TGC and heterodyne signal is fed to all the single-channel mixer 16'' wherein it produces the heterodyne frequency shift as well as the gain control. The inventive circuit requires $N+1$ multipliers where $N$ is the number of channels. The prior-art circuit of FIG. 2 requires $2N$ multipliers. The invention thus provides an important reduction in the complexity and cost of a multi-channel receiver with large number of channels.

FIG. 4 shows the waveforms of the combined TGC and heterodyne signals of FIG. 3. The TGC signal 32 starts with a low value such as zero immediately after the transmitted pulse and rises with time at a rate determined by the parameters of the system. In the nearfield region of the antenna array the beam intensity will be relatively constant and the reflected intensity will be reduced mainly by the exponential attenuation with distance through the absorbing medium. The gain in this case should rise somewhat exponentially with time. In the far-field region the beam intensity is further reduced by beam spreading, so the TGC waveform should increase faster than exponentially. The TGC signal is fed into a first input 34 of multiplier 30.

The superheterodyne signal 36 is a continous sinusoidal wave. It is fed into a second input 38 of multiplier 30. The product of the two inputs coming out of output 40 of multiplier 30 is the modulated sinusoid 42 having an amplitude envelope starting at a low value approaching zero at the instant of pulse generation and rising to a high value just before the following pulse. Mixing this waveform with the incoming signal in a receiver channel produces the desired combination of TGC and heterodyne frequency conversion.

It will be obvious to those skilled in the art that other embodiments of the invention may be made. The above described is intended to be illustrative and not limiting. The scope of the invention is to be limited only by the following claims and their legal equivalents.

I claim:

1. A multiple channel sonic beam receiver for observing internal organs and other medical applications comprising:
   a plurality of signal processing channels, each channel comprising:
   (i) a transducer;
   (ii) a first amplifier electrically coupled to said transducer and having an output;
   (iii) a first analog multiplier electrically coupled to the output of said first amplifier, and having an output;
   (iv) a second amplifier coupled to the output of said first analog multiplier and having an output;
   a scan control coupled to the outputs of each of said second amplifiers;
   a detector coupled to said scan control for detecting signals therefrom;
   an output display coupled to said detector for displaying signals received therefrom;
   a time gain control generator having an output for generating a time gain control signal;
   a superheterodyne generator having an output for generating a superheterodyne signal;
   a second analog multiplier having an input coupled to said output of said time gain conrol generator and to the output of said superheterodyne generator and having an output generating a heterodyne signal modulated by the time gain control signal, the output of said second analog multiplier electrically coupled to each of said first analog multipliers.

2. In a multiple channel sonic beam receiver having a plurality of signal processing channels, each channel having a transducer electrically coupled to a first amplifier, a first analog multiplier electrically coupled to the output of said first amplifier, an improvement comprising:
   a time gain control generator having an output, for generating a time gain control signal;
   a superheterodyne generator having an output for generating a superheterodyne signal;
   a second analog multiplier having an input coupled to said output of said time gain control generator and to said output of said superheterodyne generator and an output generating a heterodyne signal modulated by the time gain control signal, said second analog multiplier output electrically coupled to each of said first analog multipliers;
   a plurality of second amplifiers respectively coupled to the output of each of the first analog multipliers;
   a common scan control coupled to the outputs of each second amplifier to produce output signals;
   a detector coupled to said scan control for detecting said output signals; and
   an output display coupled to said detector for displaying said output signals,
   whereby the signal strength of signals produced by reflections from objects more distant from the receiver is increased and superheterodyne conversion of received signals is accomplished.

* * * * *